United States Patent
Li et al.

(10) Patent No.: US 12,185,265 B2
(45) Date of Patent: Dec. 31, 2024

(54) METHOD, APPARATUS, AND SYSTEM FOR DETERMINING SYNCHRONIZATION CYCLE

(71) Applicant: HUAWEI TECHNOLOGIES CO., LTD., Guangdong (CN)

(72) Inventors: Yexing Li, Shanghai (CN); Qi Su, Shanghai (CN); Yan Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 952 days.

(21) Appl. No.: 17/212,910

(22) Filed: Mar. 25, 2021

(65) Prior Publication Data

US 2021/0250886 A1    Aug. 12, 2021

Related U.S. Application Data

(63) Continuation of application No. PCT/CN2019/106426, filed on Sep. 18, 2019.

(30) Foreign Application Priority Data

Sep. 26, 2018   (CN) .......................... 201811128037.7

(51) Int. Cl.
  *H04J 3/06*   (2006.01)
  *H04W 56/00*  (2009.01)
  *H04W 36/08*  (2009.01)

(52) U.S. Cl.
  CPC ........ *H04W 56/0015* (2013.01); *H04W 36/08* (2013.01)

(58) Field of Classification Search
  CPC ........... H04W 56/0055; H04W 56/001; H04W 56/004; H04W 76/14; H04W 16/14;
  (Continued)

(56) References Cited

U.S. PATENT DOCUMENTS 6,377,640 B2 *  4/2002  Trans ................... H04L 1/0047
                                        375/354
7,620,403 B2 * 11/2009  Korneluk ............. G01S 19/235
                                        455/526
(Continued)

FOREIGN PATENT DOCUMENTS

CN         103052150 A       4/2013
CN         104284411 A       1/2015
(Continued)

OTHER PUBLICATIONS

Huawei, HiSilicon, Discussion on solutions of providing time reference information. 3GPP TSG-RAN WG2 Meeting #101, Athens, Greece, Feb. 26-Mar. 2, 2018, R2-1802881, 5 pages.
(Continued)

*Primary Examiner* — Jung Liu
(74) *Attorney, Agent, or Firm* — WOMBLE BOND DICKINSON (US) LLP

(57) ABSTRACT

Embodiments of this application provide a method, apparatus, and system for determining a synchronization cycle, and relate to the communications field, to determine a proper synchronizing cycle, so that air interface bandwidth resources are saved during clock synchronization in an industrial factory, energy consumption of UE is reduced, and battery power is saved. The method includes: A network device obtains a crystal oscillator frequency offset f1 of UE; the network device obtains a crystal oscillator frequency offset f2 of an AN; the network device obtains a service synchronization precision requirement t of the UE; and the network device calculates a synchronization cycle of clock synchronization between the UE and the AN based on the obtained f1, f2, and t.

14 Claims, 10 Drawing Sheets

(58) Field of Classification Search
CPC ............ H04W 56/0015; H04W 72/23; H04W 56/0005; H04W 74/0833; H04W 52/365; H04L 41/0894; H04L 41/0893; H04L 41/0895; H04L 5/0053; H04L 5/0051; H04L 27/0014

See application file for complete search history.

(56) References Cited

U.S. PATENT DOCUMENTS

| | | | | |
|---|---|---|---|---|
| 9,665,121 | B2* | 5/2017 | Aweya | G06F 1/10 |
| 11,190,989 | B2* | 11/2021 | Sirotkin | H04W 80/08 |
| 11,470,568 | B2* | 10/2022 | SivaSiva Ganesan | ............. H04J 3/0658 |
| 2002/0136335 | A1* | 9/2002 | Liou | H04N 21/4305 375/354 |
| 2014/0099950 | A1* | 4/2014 | Mildh | H04W 76/14 455/434 |
| 2015/0181546 | A1* | 6/2015 | Freda | H04W 76/14 370/336 |
| 2021/0144666 | A1* | 5/2021 | Sivasiva Ganesan | ............. H04W 56/0015 |
| 2021/0219253 | A1* | 7/2021 | Van Phan | H04W 56/0055 |

FOREIGN PATENT DOCUMENTS

| | | |
|---|---|---|
| CN | 104993898 A | 10/2015 |
| CN | 105491656 A | 4/2016 |
| CN | 106559157 A | 4/2017 |
| CN | 107329399 A | 11/2017 |
| CN | 107396439 A | 11/2017 |
| CN | 108011851 A | 5/2018 |
| CN | 108449791 A | 8/2018 |
| EP | 2256947 A1 | 12/2010 |
| JP | 2003060652 A | 2/2003 |
| WO | 2017054891 A1 | 4/2017 |

OTHER PUBLICATIONS

Huawei, HiSilicon, Discussion on the motivation of High Accuracy Time Synchronization for URLLC. 3GPP TSG RAN WGI Meeting #92bis, Sanya, China, Apr. 16-Apr. 20, 2018, RI-1804429, 7 pages.
3GPP TR 22.804 V16.1.0 (Sep. 2018), 3rd Generation Partnership Project; Technical Specification Group Services and System Aspects; Study on Communication for Automation in Vertical Domains (Release 16), 189 pages.
3GPP TR 22.821 V16.1.0 (Jun. 2018), 3rd Generation Partnership Project; Technical Specification Group Services and System Aspects; Feasibility Study on LAN Support in 5G (Release 16), 52 pages.

* cited by examiner

METHOD, APPARATUS, AND SYSTEM FOR DETERMINING SYNCHRONIZATION CYCLE

CROSS-REFERENCE TO RELATED APPLICATIONS

This application is a continuation of International Application No. PCT/CN2019/106426, filed on Sep. 18, 2019, which claims priority to Chinese Patent Application No. 201811128037.7, filed on Sep. 26, 2018. The disclosures of the aforementioned applications are hereby incorporated by reference in their entireties.

TECHNICAL FIELD

This application relates to the communications field, and in particular, to a method, an apparatus, and a system for determining a synchronization cycle.

BACKGROUND

With rapid development of communication technologies, communication for automation in vertical domains (CAV) has been widely used. In the 3rd Generation Partnership Project (3GPP) TR 22.804, an industrial factory scenario is used as one of main application scenarios of the CAV. Mobile networks can replace a part of transmission paths in industrial factories to provide communication services.

FIG. 1 is a schematic diagram of an industrial factory scenario. As shown in FIG. 1, user equipment (UE) in the industrial factory scenario accesses an industrial factory network in a wireless connection manner by using a mobile network. The mobile network is a part of transmission paths in a communication link between the UE and a controller in an industrial factory. Services in the industrial factory have requirements on clock synchronization between devices, and clock synchronization precision requirements may vary in different scenarios. Therefore, the mobile network needs to meet clock synchronization requirements of different services to support communication services in the industrial factory.

Usually, when the mobile network and the industrial factory network use a same clock source, to implement clock synchronization between the UE and the controller in the industrial factory, clock synchronization only needs to be performed between the UE and the mobile network. A specific synchronization process is as follows: An access network (AN) device of the mobile network periodically sends, to the UE, a synchronization packet that carries time information, the UE extracts the time information to calculate an offset between a local clock and a clock of the AN device, adjusts the local clock based on the offset, and completes time synchronization between the local clock and the clock of the AN device, and the clock synchronization between the UE and the mobile network is implemented, thereby achieving clock synchronization between the UE and other nodes in the industrial factory.

Due to a frequency offset characteristic of a crystal oscillator of a clock source, a clock synchronization error increases with time. Therefore, a synchronization cycle of the clock synchronization, in other words, how often the clock synchronization is performed, is crucial to the clock synchronization.

Usually, the synchronization cycle of the clock synchronization is calculated based on service precision requirements and crystal oscillator frequency offsets of two synchronization parties. In the industrial factory network, to meet the strictest service requirements, a network administrator usually considers a size of the synchronization cycle based on the strictest service requirements and the highest crystal oscillator frequency offset. In this way, a very small synchronization cycle is obtained and configured in the clock of the AN device, and the clock of the AN device periodically initiates clock synchronization with a very small synchronization cycle, and frequent clock synchronization is performed on the network.

However, for UE that supports a service that has a low precision requirement or UE with a relatively low crystal oscillator frequency offset, frequent clock synchronization signaling exchange not only wastes air interface bandwidth resources, but also leads to large power consumption of the UE and large battery power consumption.

SUMMARY

Embodiments of this application provide a method, an apparatus, and a system for determining a synchronization cycle, so that air interface bandwidth resources are saved during clock synchronization in an industrial factory, energy consumption of UE is reduced, and battery power is saved.

To achieve the foregoing objectives, the embodiments of this application use the following technical solutions:

According to a first aspect, a method for determining a synchronization cycle is provided. The method may include: A network device obtains a crystal oscillator frequency offset f1 of UE. The network device obtains a crystal oscillator frequency offset f2 of an AN. The network device obtains a service synchronization precision requirement t of the UE. The network device calculates a synchronization cycle of clock synchronization between the UE and the AN based on the obtained f1, f2, and t.

In the method for determining a synchronization cycle provided in this application, after obtaining f1, f2, and t, the network device calculates the synchronization cycle of the clock synchronization between the UE and the AN. Because the synchronization cycle is determined based on crystal oscillator performance of both clock synchronization parties and a synchronization requirement of the UE, the determined synchronization cycle meets the synchronization requirement of the UE, and also complies with the crystal oscillator performance of both the clock synchronization parties. Therefore, a proper synchronization cycle is determined in the solution of this application, and the clock synchronization between the UE and the AN is performed based on the proper synchronization cycle. On the basis of meeting a synchronization precision requirement of the UE, a waste of air interface bandwidth resources and a waste of battery power of the UE that are caused by frequent synchronization are avoided, and the proper synchronization cycle is determined, thereby ensuring that air interface bandwidth resources are saved during clock synchronization in an industrial factory, reducing energy consumption of the UE, and saving battery power.

With reference to the first aspect, in a possible implementation, that a network device obtains a crystal oscillator frequency offset f1 of UE may include: The network device obtains f1 from the UE. The network device may receive, from the UE, f1 reported by the UE.

With reference to the first aspect or any one of the foregoing possible implementations, in another possible implementation, that the network device obtains a crystal oscillator frequency offset f2 of an AN may include: The network device obtains f2 from the AN. The network device may receive, from the AN, f2 reported by the AN.

With reference to the first aspect or any one of the foregoing possible implementations, in another possible implementation, that the network device obtains a service synchronization precision requirement t of the UE may include: The network device obtains t from a core network device.

With reference to the first aspect or any one of the foregoing possible implementations, in another possible implementation, the network device may include an AN that performs clock synchronization with the UE. In this case, that a network device obtains a crystal oscillator frequency offset f1 of UE may include: The AN receives f1 from the UE in a phase in which the UE registers with an access network. It should be noted that, in the phase in which the UE registers with the access network, the UE may add f1 to an interaction message between the UE and the AN for sending. A type of the interaction message that carries f1 is not specifically limited in this application.

With reference to the first aspect or any one of the foregoing possible implementations, in another possible implementation, the network device may include an AN that performs clock synchronization with the UE. In this case, that the network device obtains a service synchronization precision requirement t of the UE may include: The AN receives t from a core network device in a protocol data unit (PDU) session creation phase. It should be noted that, in the PDU session creation phase, the core network device may add t to an interaction message between the core network device and the AN for sending. A type of the interaction message that carries t is not specifically limited in this application.

It should be noted that, when the network device is an AN that performs clock synchronization with the UE, an implementation that the network device obtains a crystal oscillator frequency offset f2 of an AN is: reading the crystal oscillator frequency offset f2 from inside the network device.

With reference to the first aspect or any one of the foregoing possible implementations, in another possible implementation, the network device may include a core network device. In this case, that a network device obtains a crystal oscillator frequency offset f1 of UE may include: The core network device receives f1 from the UE in a PDU session creation phase. It should be noted that, in the PDU session creation phase, the UE may add f1 to an interaction message between the UE and the core network device for sending. A type of the interaction message that carries f1 is not specifically limited in this application. On this basis, the method for determining a synchronization cycle provided in this application may further include: The core network device sends a synchronization cycle calculated by the core network device to an AN that performs clock synchronization with the UE, so that the AN performs clock synchronization with the UE based on the synchronization cycle.

With reference to the first aspect or any one of the foregoing possible implementations, in another possible implementation, the network device may include a core network device. In this case, that the network device obtains a crystal oscillator frequency offset f2 of an AN may include: The core network device receives f2 from the AN in a PDU session creation phase. It should be noted that, in the PDU session creation phase, the AN may add f2 to an interaction message between the AN and the core network device for sending. A type of the interaction message that carries f2 is not specifically limited in this application. On this basis, the method for determining a synchronization cycle provided in this application may further include: The core network device sends a synchronization cycle calculated by the core network device to an AN that performs clock synchronization with the UE, so that the AN performs clock synchronization with the UE based on the synchronization cycle.

It should be noted that, when the network device is a core network device accessed by the AN that performs clock synchronization with the UE, an implementation that the network device obtains t is: reading t from inside the network device.

With reference to the first aspect or any one of the foregoing possible implementations, in another possible implementation, the network device may include an AN that performs clock synchronization with the UE, and the AN is a target AN used when the UE is handed over from an access network. In this case, that a network device obtains a crystal oscillator frequency offset f1 of UE includes: The target AN obtains f1 from a source AN by using a handover command. That the network device obtains a service synchronization precision requirement t of the UE includes: The target AN obtains t from the source AN by using the handover command. f1 and t are separately carried in the handover command and sent to the target AN. A type of the handover command is not specifically limited in this application.

With reference to the first aspect or any one of the foregoing possible implementations, in another possible implementation, the network device may include an AN that performs clock synchronization with the UE, and the AN is a target AN used when the UE is handed over from an access network. In this case, that a network device obtains a crystal oscillator frequency offset f1 of UE includes: The target AN obtains f1 from the UE by using a handover command. That the network device obtains a service synchronization precision requirement t of the UE includes: The target AN obtains t from a core network device by using a path request response command.

With reference to the first aspect or any one of the foregoing possible implementations, in another possible implementation, the network device may include a core network device, and an AN that performs clock synchronization with the UE is a target AN used when the UE is handed over from an access network. In this case, that the network device obtains a crystal oscillator frequency offset f2 of an AN may include: The core network device obtains f2 from the target AN by using a handover command. On this basis, the method for determining a synchronization cycle provided in this application may further include: The core network device sends a synchronization cycle calculated by the core network device to an AN that performs clock synchronization with the UE, so that the AN performs clock synchronization with the UE based on the synchronization cycle.

With reference to the first aspect or any one of the foregoing possible implementations, in another possible implementation, that the network device calculates a synchronization cycle of clock synchronization between the UE and the AN based on f1, f2, and t may include: The network device calculates the synchronization cycle as $t/(f1+f2)$.

With reference to the first aspect or any one of the foregoing possible implementations, in another possible implementation, the AN may include a source AN from which the UE is handed over from an access network, and the method for determining a synchronization cycle provided in the first aspect may further include: The source AN sends f1 and t to a target AN to which the UE is handed over from an access network, so that the target AN determines a synchronization cycle of clock synchronization between the UE and the target AN.

According to a second aspect, this application provides another method for determining a synchronization cycle. The method may include: UE sends a crystal oscillator frequency offset f1 of the UE to a network device, where f1 is used to determine a synchronization cycle of clock synchronization between the UE and an AN; the UE receives a synchronization packet sent by the AN based on the synchronization cycle, where the synchronization packet carries time information of the AN; and the UE adjusts a local clock based on the time information to perform clock synchronization with the AN.

According to the method for determining a synchronization cycle provided in this application, the UE reports the crystal oscillator frequency offset f1 of the UE, to be used by the network device to determine the synchronization cycle of the clock synchronization between the UE and the AN, so that the synchronization cycle that is of the clock synchronization between the UE and the AN and that is calculated by the network device is strongly related to the crystal oscillator frequency offset f1 of the UE, and meets performance of the UE, and the determined synchronization cycle is more proper. On the basis of meeting a service synchronization precision requirement of the UE, the proper synchronization cycle makes it possible to avoid a waste of air interface bandwidth resources and a waste of battery power of the UE that are caused by frequent synchronization, and determine the proper synchronization cycle, thereby ensuring that air interface bandwidth resources are saved during clock synchronization in an industrial factory, reducing energy consumption of the UE, and saving battery power.

It should be noted that, the method for determining a synchronization cycle provided in the second aspect and the method for determining a synchronization cycle provided in the first aspect are the same method, but the first aspect is described from the perspective of the network device, and the second aspect is described from the perspective of the UE. Therefore, for specific implementation of the second aspect, refer to specific implementation of the first aspect.

With reference to the second aspect, in a possible implementation, the network device may include an AN that performs clock synchronization with the UE. In this case, that UE sends a crystal oscillator frequency offset f1 of the UE to a network device may include: The UE sends f1 to the AN in a phase in which the UE registers with an access network. It should be noted that, in the phase in which the UE registers with the access network, the UE may add f1 to an interaction message between the UE and the AN for sending. A type of the interaction message that carries f1 is not specifically limited in this application.

With reference to the second aspect or any one of the foregoing possible implementations, in another possible implementation, the network device may include an AN that performs clock synchronization with the UE, and the AN is a target AN used when the UE is handed over from an access network. In this case, that UE sends a crystal oscillator frequency offset f1 of the UE to a network device may include: The UE sends f1 to the target AN by using a handover command.

With reference to the second aspect or any one of the foregoing possible implementations, in another possible implementation, the network device may include a core network device. In this case, that UE sends a crystal oscillator frequency offset f1 of the UE to a network device includes: The UE sends f1 to the core network device in a PDU session creation phase.

According to a third aspect, this application provides still another method for determining a synchronization cycle. The method may include: An AN sends a crystal oscillator frequency offset f2 of the AN to a core network device, where f2 is used to determine a synchronization cycle of clock synchronization between UE and the AN; the AN receives a synchronization cycle sent by the core network device; and the AN periodically sends a synchronization packet to the UE based on the synchronization cycle, where the synchronization packet carries time information of the AN, so that the UE adjusts a local clock based on the time information, and completes the clock synchronization with the AN.

According to the method for determining a synchronization cycle provided in this application, the AN reports the crystal oscillator frequency offset f2 of the AN, to be used by the core network device to determine the synchronization cycle of the clock synchronization between the UE and the AN, so that the determined synchronization cycle of the clock synchronization between the UE and the AN is strongly related to the crystal oscillator frequency offset f2 of the AN, and meets performance of the AN, and the determined synchronization cycle is more proper. On the basis of meeting a service synchronization precision requirement of the UE, the proper synchronization cycle makes it possible to avoid a waste of air interface bandwidth resources and a waste of battery power of the UE that are caused by frequent synchronization, and determine the proper synchronization cycle, thereby ensuring that air interface bandwidth resources are saved during clock synchronization in an industrial factory, reducing energy consumption of the UE, and saving battery power.

It should be noted that, the method for determining a synchronization cycle provided in the third aspect and the method for determining a synchronization cycle provided in the first aspect are the same method, but the first aspect is described from the perspective of the network device, and the third aspect is described from the perspective of the AN. Therefore, for specific implementation of the third aspect, refer to specific implementation of the first aspect.

With reference to the third aspect, in a possible implementation, that an AN sends a crystal oscillator frequency offset f2 of the AN to a core network device may include: The AN sends f2 to the core network device in a PDU session creation phase, to be used by the core network device to determine the synchronization cycle of the clock synchronization between the AN and the UE.

With reference to the third aspect or any one of the foregoing possible implementations, in another possible implementation, the AN may be a target AN to which the UE is handed over from an access network. In this case, that an AN sends a crystal oscillator frequency offset f2 of the AN to a core network device may specifically include: The AN sends f2 to the core network device by using a handover command.

According to a fourth aspect, this application provides yet another method for determining a synchronization cycle. The method may include: A core network device sends a service synchronization precision requirement t of UE to an AN, to be used by the AN to determine a synchronization cycle of clock synchronization between the UE and the AN.

It should be noted that, the method for determining a synchronization cycle provided in the fourth aspect and the method for determining a synchronization cycle provided in the first aspect are the same method, but the first aspect is described from the perspective of the network device, and the fourth aspect is described from the perspective of the core network device. Therefore, for specific implementation of the fourth aspect, refer to specific implementation of the first aspect. A same effect can be achieved and details are not described herein again.

With reference to the fourth aspect, in a possible implementation, that a core network device sends a service synchronization precision requirement t of UE to an AN may include: The core network device sends the service synchronization precision requirement t of the UE to the AN in a PDU session creation phase.

With reference to the fourth aspect or any one of the foregoing possible implementations, in another possible implementation, the AN may be a target AN to which the UE is handed over from an access network. In this case, that a core network device sends a service synchronization precision requirement t of UE to an AN may specifically include: The core network device sends the service synchronization precision requirement t of the UE to the AN by using a path request response command.

According to a fifth aspect, an embodiment of this application provides an apparatus for determining a synchronization cycle. The apparatus may implement functions of the network device in the method example in the first aspect or the second aspect. The functions may be implemented by hardware, or may be implemented by hardware by executing corresponding software. The hardware or the software includes one or more modules corresponding to the foregoing functions.

With reference to the fifth aspect, in a possible implementation, a structure of the apparatus includes a processor and a transceiver, and the processor is configured to support the apparatus in performing corresponding functions in the foregoing method. The transceiver is configured to support communication between the apparatus and another device. The apparatus may further include a memory. The memory is configured to be coupled to the processor and stores a program instruction and data that are necessary for the apparatus.

According to a sixth aspect, an embodiment of this application provides an AN, including the apparatus for determining a synchronization cycle for implementing functions of the network device in the method example in the first aspect or the second aspect.

According to a seventh aspect, an embodiment of this application provides a core network device, including the apparatus for determining a synchronization cycle for implementing functions of the network device in the method example in the first aspect or the second aspect.

According to an eighth aspect, an embodiment of this application provides an apparatus for determining a synchronization cycle. The apparatus may implement functions of the UE in the foregoing method example in the first aspect or the second aspect. The functions may be implemented by hardware, or may be implemented by hardware by executing corresponding software. The hardware or the software includes one or more modules corresponding to the foregoing functions.

With reference to the eighth aspect, in a possible implementation, a structure of the apparatus includes a processor and a transceiver, and the processor is configured to support the apparatus in performing corresponding functions in the foregoing method. The transceiver is configured to support communication between the apparatus and another device. The apparatus may further include a memory. The memory is configured to be coupled to the processor and stores a program instruction and data that are necessary for the apparatus.

According to a ninth aspect, an embodiment of this application provides UE, including the apparatus for determining a synchronization cycle for implementing functions of the UE in the method example in the first aspect or the second aspect.

According to a tenth aspect, an embodiment of this application provides a system for determining a synchronization cycle, including the foregoing network device and UE.

According to an eleventh aspect, an embodiment of this application provides a computer storage medium, configured to store a computer software instruction used by the foregoing method examples. The computer storage medium includes a program designed for performing the first aspect to the fourth aspect.

According to a twelfth aspect, an embodiment of this application provides a computer program product. When the computer program product runs on a computer, the computer is enabled to execute programs related to the first aspect to the fourth aspect.

Solutions provided in the fifth aspect to the twelfth aspect are used to implement the methods for determining a synchronization cycle provided in the first aspect to the fourth aspect, and therefore can achieve same beneficial effects as the first aspect to the fourth aspect. Details are not described herein again.

DESCRIPTION OF EMBODIMENTS

Figure 1:
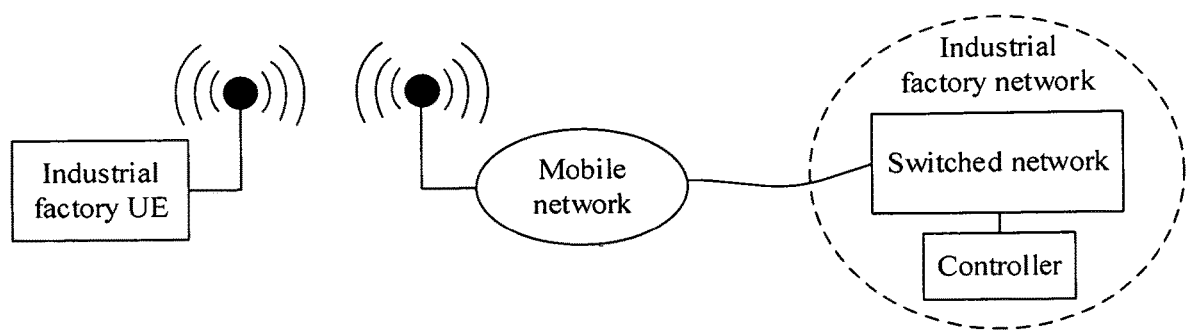
FIG. 1 is a schematic diagram of an industrial factory network architecture according to the current technology.

Based on the above, this application proposes a method for determining a synchronization cycle, to determine a proper synchronization cycle when clocks of an AN and UE are configured, so that on the basis of meeting a service synchronization precision requirement of the UE, a waste of air interface bandwidth resources and a waste of battery power of the UE that are caused by frequent synchronization are avoided. A basic principle of the method is: A network device obtains a crystal oscillator frequency offset of the UE, a crystal oscillator frequency offset of the AN, and the service synchronization precision requirement of the UE, and accordingly calculates a synchronization cycle used when the UE performs clock synchronization with the AN, so as to determine a proper synchronization cycle. On the basis of meeting the service synchronization precision requirement of the UE, a waste of air interface bandwidth resources and a waste of battery power of the UE that are caused by frequent synchronization are avoided.

The UE described in this application is an endpoint device in an industrial factory network or a mobile network device connected to a factory device. The endpoint device is connected to a controller of the industrial factory network in a wired or wireless manner.

The endpoint device may be various types of sensors, servo motors, mobile robots, or the like. In different types of industrial factory networks, the endpoint device may have different types, but all may be understood as the UE described in this application. A type of the UE is not specifically limited in the embodiments of this application.

The mobile network device is a part or all of a mobile communications device used by a user in a mobile network. For example, the mobile network device may be a mobile phone, a tablet computer, a notebook computer, an ultra-mobile personal computer (UMPC), a netbook, a personal digital assistant (PDA), an e-book, a mobile TV, a wearable device, or a personal computer (PC). In communications systems of different standards, the mobile network device may have different names. A type of the mobile network device is not specifically limited in the embodiments of this application. Any mobile network device connected to a factory device may be understood as the UE described in this application.

For example, when the UE is wirelessly connected to the controller, the mobile network may act as a part of a transmission path between the UE and the controller to provide communication services. Optionally, a standard of the mobile network described in this application is not limited in the embodiments of this application. For example, the mobile network described in this application may include a 5th-generation (5G) network, a long term evolution (LTE) network, or a universal mobile telecommunications system (UMTS) network, or another network. A standard type of the mobile network in this application is not specifically limited in the embodiments of this application.

The AN described in this application is a node device that provides an access service for the UE in the mobile network. The UE accesses a core network device in the mobile network through the AN to use the mobile network. In mobile networks of different standards, the AN may have different names, but all may be understood as the AN described in this application. A type of the AN is not specifically limited in the embodiments of this application. For example, an AN in a universal mobile telecommunications system (UMTS) is referred to as a base station (BS), an AN in an LTE system is referred to as an evolved Node B (eNB), and an AN in a 5G system is referred to as a radio access network (RAN). ANs are not listed one by one herein. Any node device that provides an access service for the UE in the mobile network may be understood as the AN described in this application.

Figure 2:
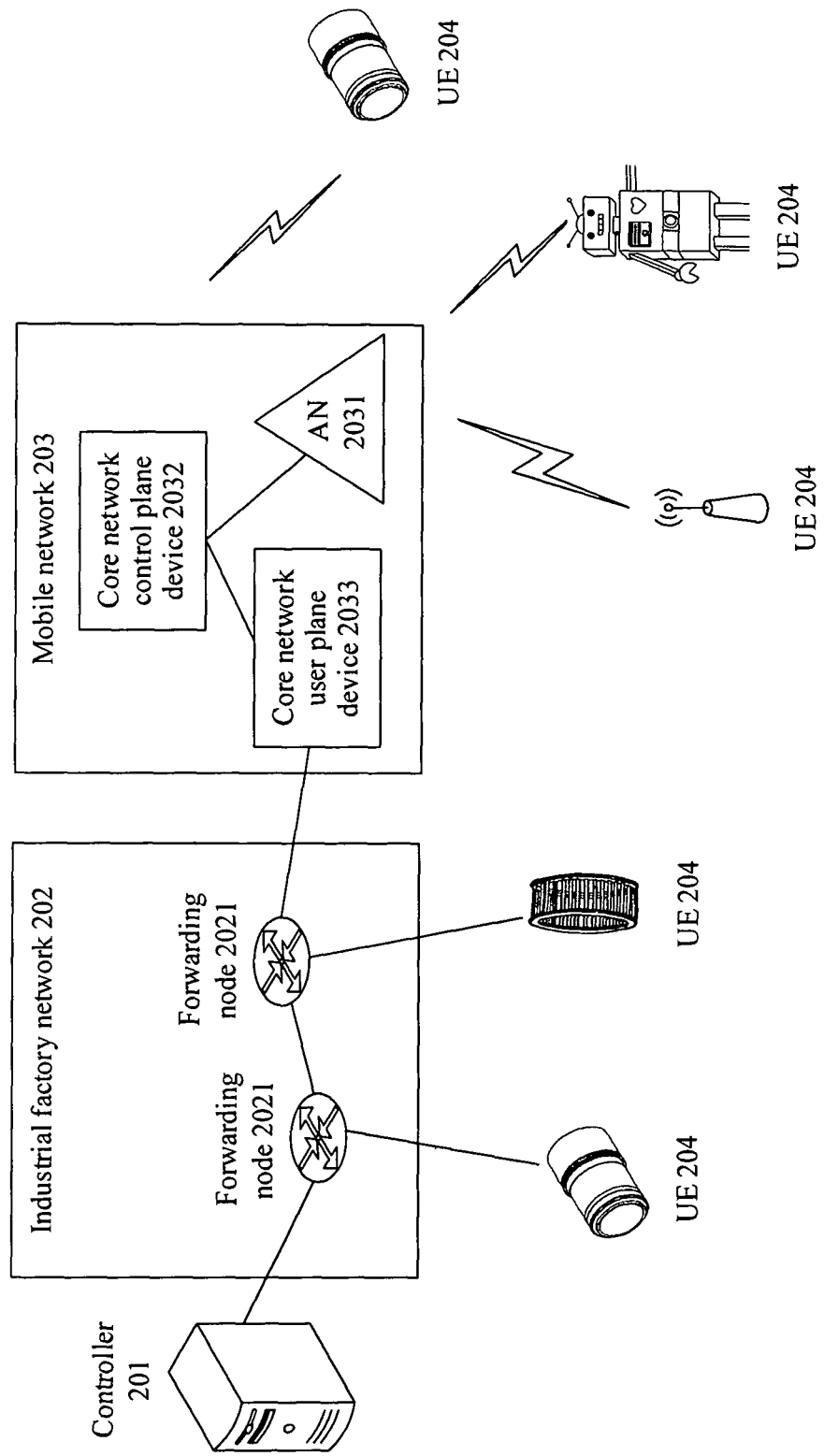
FIG. 2 is a schematic diagram of an industrial factory network architecture in an application scenario of a solution of this application.

The method for determining a synchronization cycle provided in this application is applied to an industrial factory network shown in FIG. 2. As shown in FIG. 2, the industrial factory network includes a controller 201, an industrial factory network 202, a mobile network 203, and a plurality of UEs 204.

Optionally, the industrial factory network 202 may be a time sensitive network (TSN). Certainly, the industrial factory network 202 may be a network of another type. This is not specifically limited in the embodiments of this application.

As shown in FIG. 2, the industrial factory network 202 includes at least one forwarding node 2021, and the mobile network 203 includes an AN 2031, a core network control plane device 2032, and a core network user plane device 2033.

In the industrial factory network shown in FIG. 2, some UEs 204 access the controller 201 by using the industrial factory network 202, and some UEs 204 access the controller 201 by using the mobile network 203. The mobile network 203 uses a same clock source as the industrial factory network 202 and the controller. Therefore, that UEs 204 accessing the controller 201 by using the mobile network 203 performs clock synchronization with a node in the industrial factory network 202 may be completed by performing clock synchronization with the mobile network 203.

It should be noted that although the mobile network 203 shown in FIG. 2 is shown related to only the AN 2031, the core network control plane device 2032, and the core network user plane device 2033 in the solutions of this application, the mobile network 203 may further include another network element that is not shown.

It should be noted that FIG. 2 shows merely an example of an industrial factory network architecture. Specific content in the industrial factory network architecture may be configured according to an actual requirement, and FIG. 2 is not a specific limitation on the content.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner for ease of understanding.

Before the embodiments of this application are described, terms in this application are first explained herein.

Crystal oscillators are widely used in various oscillation circuits such as color TV sets, computers, and remote controls, as well as frequency generators in communication systems, for generating clock signals for data processing devices, and providing reference signals for specific systems. This specification describes application of the crystal oscillators in generating clock signals.

A crystal oscillator frequency offset is a physical attribute parameter of a crystal oscillator. A maximum frequency deviation that is between a crystal oscillator frequency and a given nominal frequency and that is caused by a combination of all specified working parameters and non-working parameters in a specified period of time in an oscillation process of the crystal oscillator is referred to as a frequency offset. When the crystal oscillator is applied to a circuit that generates a clock signal, a clock signal generated by the crystal oscillator changes with oscillation of the crystal oscillator due to existence of a crystal oscillator frequency offset. Therefore, in a scenario in which clock synchronization is required, clock synchronization needs to be periodically performed to overcome a clock synchronization deviation caused by the crystal oscillator frequency offset. The crystal oscillator frequency offset is usually expressed by a time offset per second, and is generally expressed as parts per million (ppm), where 1 ppm indicates an offset of 1 microsecond (µs) per second.

A service synchronization precision requirement of UE is a requirement of a service subscribed to by the UE for a clock synchronization deviation. A higher synchronization precision requirement indicates a shorter synchronization cycle of clock synchronization. The service synchronization precision requirement of the UE is determined by the service subscribed to by the UE. Different services have their own synchronization precision requirements in a network. The service synchronization precision requirement of the UE described in this specification is the most strict synchronization precision requirement among a plurality of services subscribed to by the UE in the network.

The following describes in detail the embodiments of this application with reference to accompanying drawings.

Figure 3:
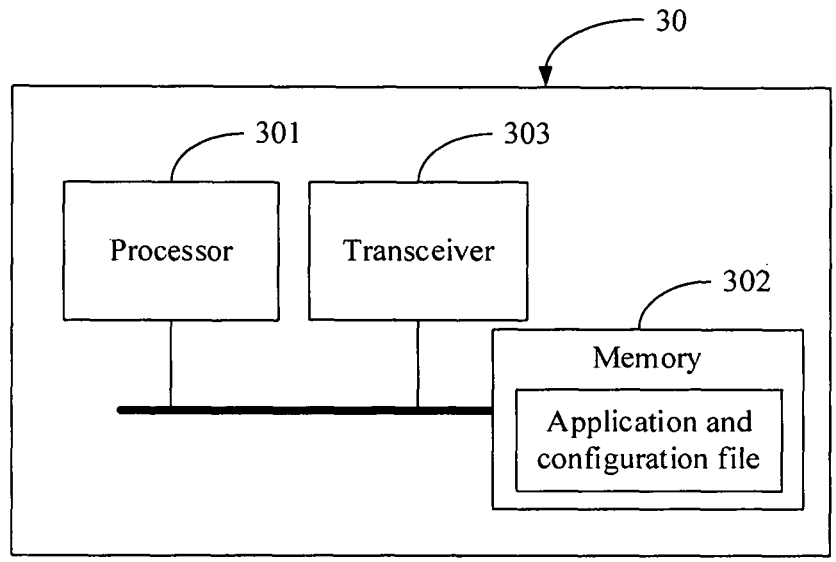
FIG. 3 is a schematic structural diagram of a network device according to an embodiment of this application.

According to one aspect, an embodiment of this application provides a network device. FIG. 3 shows a network device 30 related to embodiments of this application. The network device 30 may be the AN 2031 or the core network control plane device 2032 in the mobile network 203 in the industrial factory network shown in FIG. 2. As shown in FIG. 3, the network device 30 may include a processor 301, a memory 302, and a transceiver 303.

The following specifically describes the components of the network device 30 with reference to FIG. 3.

The memory 302 may be a volatile memory, for example, a random access memory (RAM); or a non-volatile memory, for example, a read-only memory (ROM), a flash memory, a hard disk (HDD), or a solid-state drive (SSD); or a combination of the foregoing types of memories. The memory 302 is configured to store program code and a configuration file that can implement a method in this application.

The processor 301 is a control center of the network device 30, and may be a central processing unit (CPU), or an application specific integrated circuit (ASIC), or may be configured as one or more integrated circuits implementing this embodiment of this application, for example, one or more microprocessors (DSP) or one or more field programmable gate arrays (FPGA). The processor 301 may execute various functions of the network device 30 by running or executing a software program and/or a module stored in the memory 302 and by invoking data stored in the memory 302.

The transceiver 303 is configured for interaction between the network device 30 and another unit. For example, the transceiver 303 may be a transceiver antenna or a transceiver port of the network device 30.

The processor 301 runs or executes the software program and/or the module stored in the memory 302, and invokes the data stored in the memory 302, to perform the following functions:

obtaining a crystal oscillator frequency offset f1 of UE; obtaining a crystal oscillator frequency offset f2 of an AN; obtaining a service synchronization precision requirement t of the UE; and calculating a synchronization cycle of clock synchronization between the UE and the AN based on f1, f2, and t.

Figure 4:
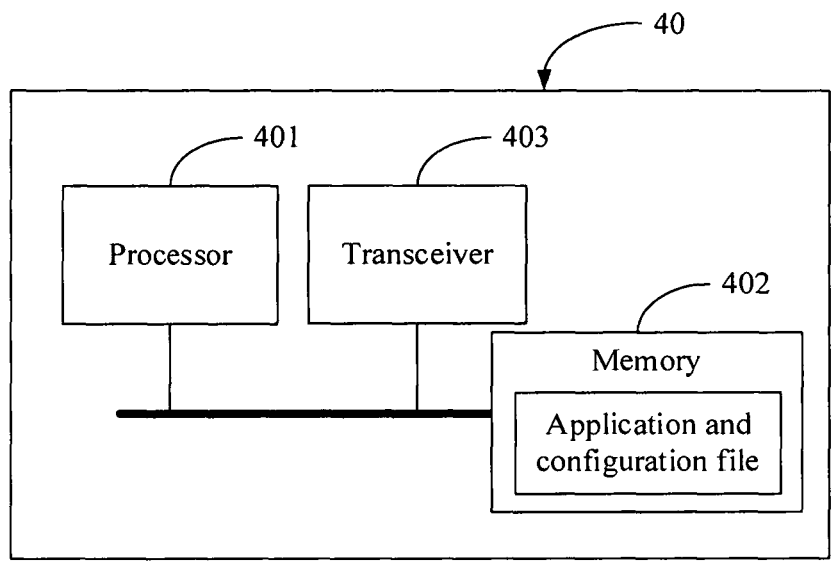
FIG. 4 is a schematic structural diagram of UE according to an embodiment of this application.

According to another aspect, an embodiment of this application provides UE. FIG. 4 shows UE 40 related to embodiments of this application. The UE 40 may be the UE 204 connected to the controller 201 by using the mobile network 203 in the industrial factory network shown in FIG. 2. As shown in FIG. 4, the UE 40 may include a processor 401, a memory 402, and a transceiver 403.

The following specifically describes the components of the UE 40 with reference to FIG. 4.

The memory 402 may be a volatile memory, for example, a RAM; or a non-volatile memory, for example, a ROM, a flash memory, an HDD, or an SSD; or a combination of the foregoing types of memories. The memory 402 is configured to store program code and a configuration file that can implement a method in this application.

As a control center of the UE 40, the processor 401 may be a CPU, or an ASIC, or one or more integrated circuits configured to implement the embodiments of this application, such as one or more DSPs or one or more FPGAs. The processor 401 may execute various functions of the UE 40 by running or executing a software program and/or a module stored in the memory 402 and by invoking data stored in the memory 402.

The transceiver 403 is configured for interaction between the UE 40 and another unit. For example, the transceiver 403 may be a transceiver antenna or a transceiver port of the UE 40.

The processor 401 runs or executes the software program and/or the module stored in the memory 402, and invokes the data stored in the memory 402, to perform the following functions:

sending a crystal oscillator frequency offset f1 of the UE 40 to a network device by using the transceiver 403, where f1 is used to determine a synchronization cycle of clock synchronization between the UE 40 and an AN; receiving, by using the transceiver 403, a synchronization packet sent by the AN based on the synchronization cycle, where the synchronization packet carries time information of the AN; and adjusting a local clock based on the time information to perform clock synchronization with the AN.

Figure 5:
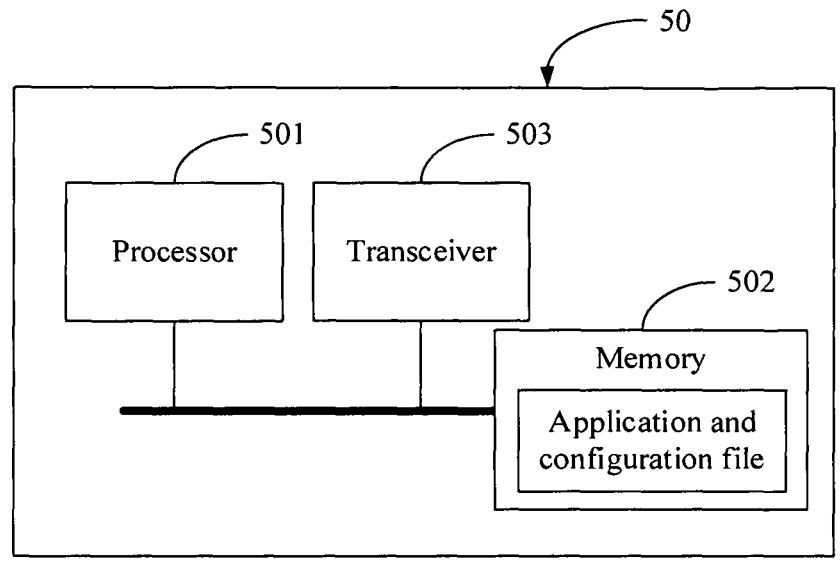
FIG. 5 is a schematic structural diagram of an AN according to an embodiment of this application.

According to still another aspect, an embodiment of this application provides an AN. FIG. 5 shows an AN 50 related to embodiments of this application. The AN 50 may be the AN 2031 in the mobile network 203 in the industrial factory network shown in FIG. 2. As shown in FIG. 5, the AN 50 may include a processor 501, a memory 502, and a transceiver 503.

The following specifically describes the components of the AN 50 with reference to FIG. 5.

The memory 502 may be a volatile memory, for example, a RAM; or a non-volatile memory, for example, a ROM, a flash memory, an HDD, or an SSD; or a combination of the foregoing types of memories. The memory 502 is configured to store program code and a configuration file that can implement a method in this application.

As a control center of the AN 50, the processor 501 may be a CPU, or an ASIC, or one or more integrated circuits configured to implement the embodiments of this application, such as one or more DSPs or one or more FPGAs. The processor 501 may execute various functions of the AN 50 by running or executing a software program and/or a module stored in the memory 502 and by invoking data stored in the memory 502.

The transceiver 503 is configured for interaction between the AN 50 and another unit. For example, the transceiver 503 may be a transceiver antenna or a transceiver port of the AN 50.

The processor 501 runs or executes the software program and/or the module stored in the memory 502, and invokes the data stored in the memory 502, to perform the following functions:

sending a crystal oscillator frequency offset f2 of the AN 50 to a core network device by using the transceiver 503, where f2 is used to determine a synchronization cycle of clock synchronization between UE and the AN 50; receiving, by using the transceiver 503, a synchronization cycle sent by the core network device; and periodically sending a synchronization packet to the UE based on the synchronization cycle, where the synchronization packet carries time information of the AN 50, so that the UE adjusts a local clock based on the time information, and completes the clock synchronization with the AN 50.

Figure 6:
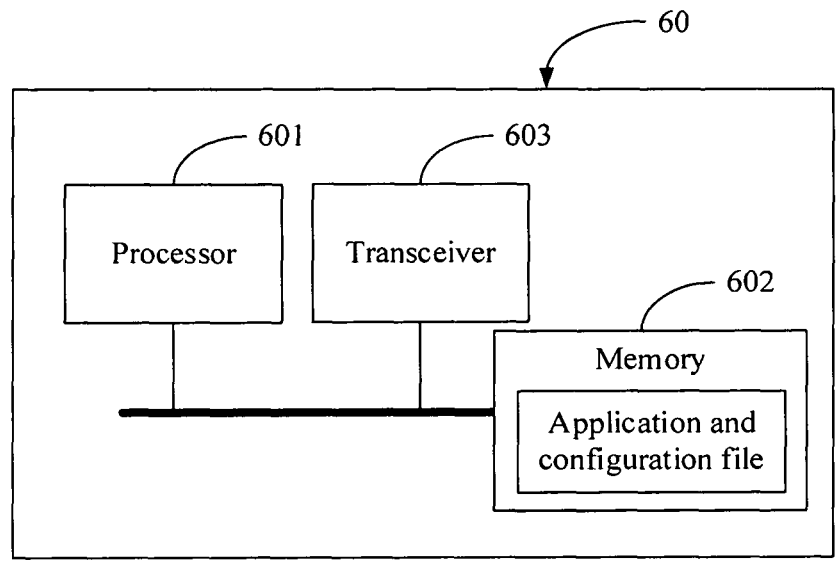
FIG. 6 is a schematic structural diagram of a core network device according to an embodiment of this application.

According to yet another aspect, an embodiment of this application provides a core network device. FIG. 6 shows a core network device 60 related to embodiments of this application. The core network device 60 may be the core network control plane device 2032 in the mobile network 203 in the industrial factory network shown in FIG. 2. As shown in FIG. 6, the core network device 60 may include a processor 601, a memory 602, and a transceiver 603.

The following specifically describes the components of the core network device 60 with reference to FIG. 6.

The memory 602 may be a volatile memory, for example, a RAM; or a non-volatile memory, for example, a ROM, a flash memory, an HDD, or an SSD; or a combination of the foregoing types of memories. The memory 602 is configured to store program code and a configuration file that can implement a method in this application.

As a control center of the core network device 60, the processor 601 may be a CPU, or an ASIC, or one or more integrated circuits configured to implement the embodiments of this application, such as one or more DSPs or one or more FPGAs. The processor 601 may execute various functions of the core network device 60 by running or executing a software program and/or a module stored in the memory 602 and by invoking data stored in the memory 602.

The transceiver 603 is configured for interaction between the core network device 60 and another unit. For example, the transceiver 603 may be a transceiver antenna or a transceiver port of the core network device 60.

The processor 601 runs or executes the software program and/or the module stored in the memory 602, and invokes the data stored in the memory 602, to perform the following function: sending a service synchronization precision requirement t of UE to an AN by using the transceiver 603, to be used by the AN to determine a synchronization cycle of clock synchronization between the UE and the AN.

According to still yet another aspect, an embodiment of this application provides a method for determining a synchronization cycle, and the method is applied to a process of clock synchronization between UE and an AN in an industrial factory network. It should be noted that the UE described in this application is any UE that is connected to a controller by using a mobile network in the industrial factory network. For each UE connected to the controller by using the mobile network, an implementation process of determining a synchronization cycle of clock synchronization between the UE and the AN is the same. This specification describes only specific implementation of determining a synchronization cycle of clock synchronization between UE and an AN.

Figure 7:
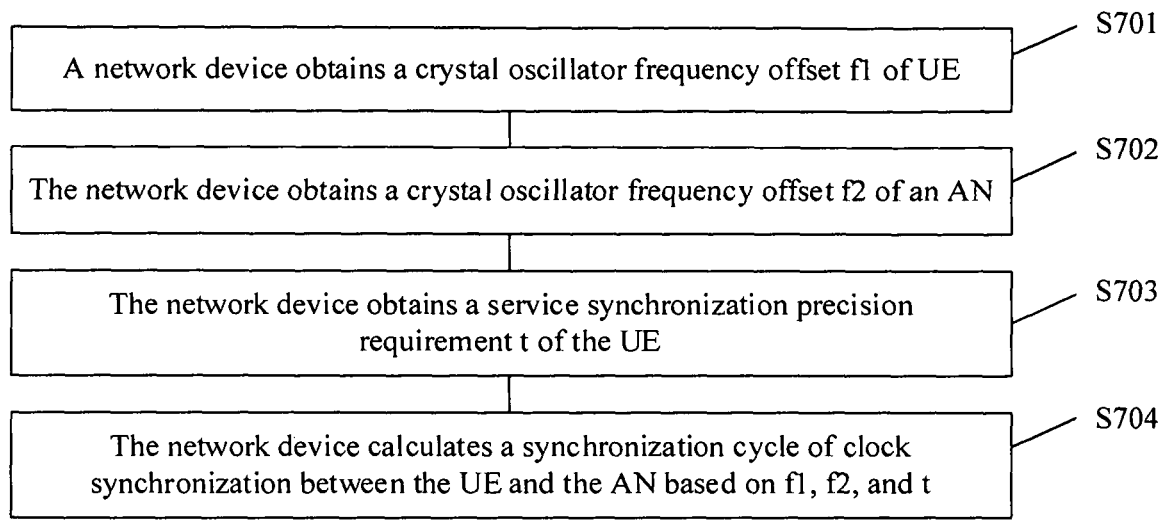
FIG. 7 is a schematic flowchart of a method for determining a synchronization cycle according to an embodiment of this application.

As shown in FIG. 7, a method for determining a synchronization cycle provided in an embodiment of this application may include the following steps.

S701: A network device obtains a crystal oscillator frequency offset f1 of UE.

The network device described in this embodiment of this application is a network element in which an apparatus for performing the method for determining a synchronization cycle provided in this application is deployed. Optionally, the network device may be a core network device in a mobile network to which an AN that performs clock synchronization with the UE belongs or the AN that performs clock synchronization with the UE. This is not specifically limited in this embodiment of this application.

It should be noted that the core network device described in this specification is a control plane device in a core network, and is simply referred to as a core network device in this specification.

Optionally, when the network device includes the AN that performs clock synchronization with the UE, the core network device described in this specification may be a core network element that completes access management, and the network element directly interacts with the AN. For example, the core network device may be an access management function (AMF) network element.

Optionally, when the network device is a core network device, the core network device described in this specification may be an access management function network element that completes access management in a core network, or may be a session management function network element that completes session management, or may be a policy control function network element that completes formulating a policy rule and a charging rule to control a service bearer, or may be another core network element, or may be a newly configured core network element used to perform the solutions in this application. This is not specifically limited in this embodiment of this application.

In different communications systems, a name of a network element has different definitions. The name of the network element is not specifically limited in this embodiment of this application. For example, in a 4th-generation (4G) mobile network, the access management network element is a mobility management entity (MME), the session management function network element is a packet data network (PDN) gateway control plane function (PGW-C) network element, and the policy control function network element is a policy and charging rules function (PCRF) network element. In a 5th-generation (5G) mobile network, the access management network element is an access and mobility management function (AMF) network element, and the session management function network element is a session management function (SMF) network element, and the policy control function network element is a policy control function (PCF) network element.

Optionally, that a network device obtains a crystal oscillator frequency offset f1 of UE in S701 may be specifically implemented by using the following two possible implementations, including the following first possible implementation and the following second possible implementation. Certainly, implementation of S701 is not limited thereto.

First possible implementation: the network device obtains f1 from the UE.

A frequency offset of a crystal oscillator is an inherent attribute of the crystal oscillator. The frequency offset f1 of a crystal oscillator deployed in the UE is a known parameter for the UE, and the network device may obtain f1 from the UE. It may be understood that S701 may be implemented by reporting f1 to the network device by the UE.

Figure 8:
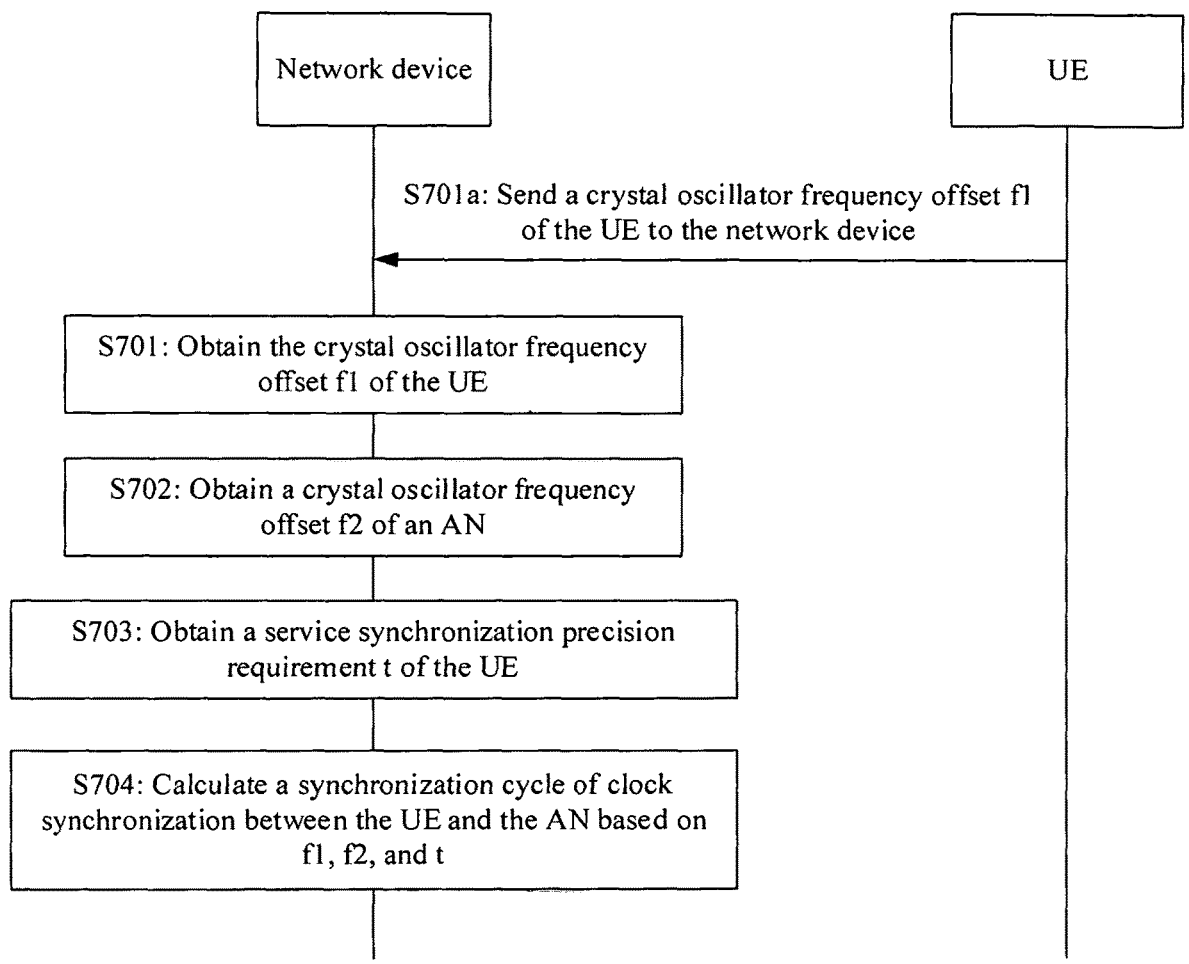
FIG. 8 is another schematic flowchart of a method for determining a synchronization cycle according to an embodiment of this application.
Figure 9:
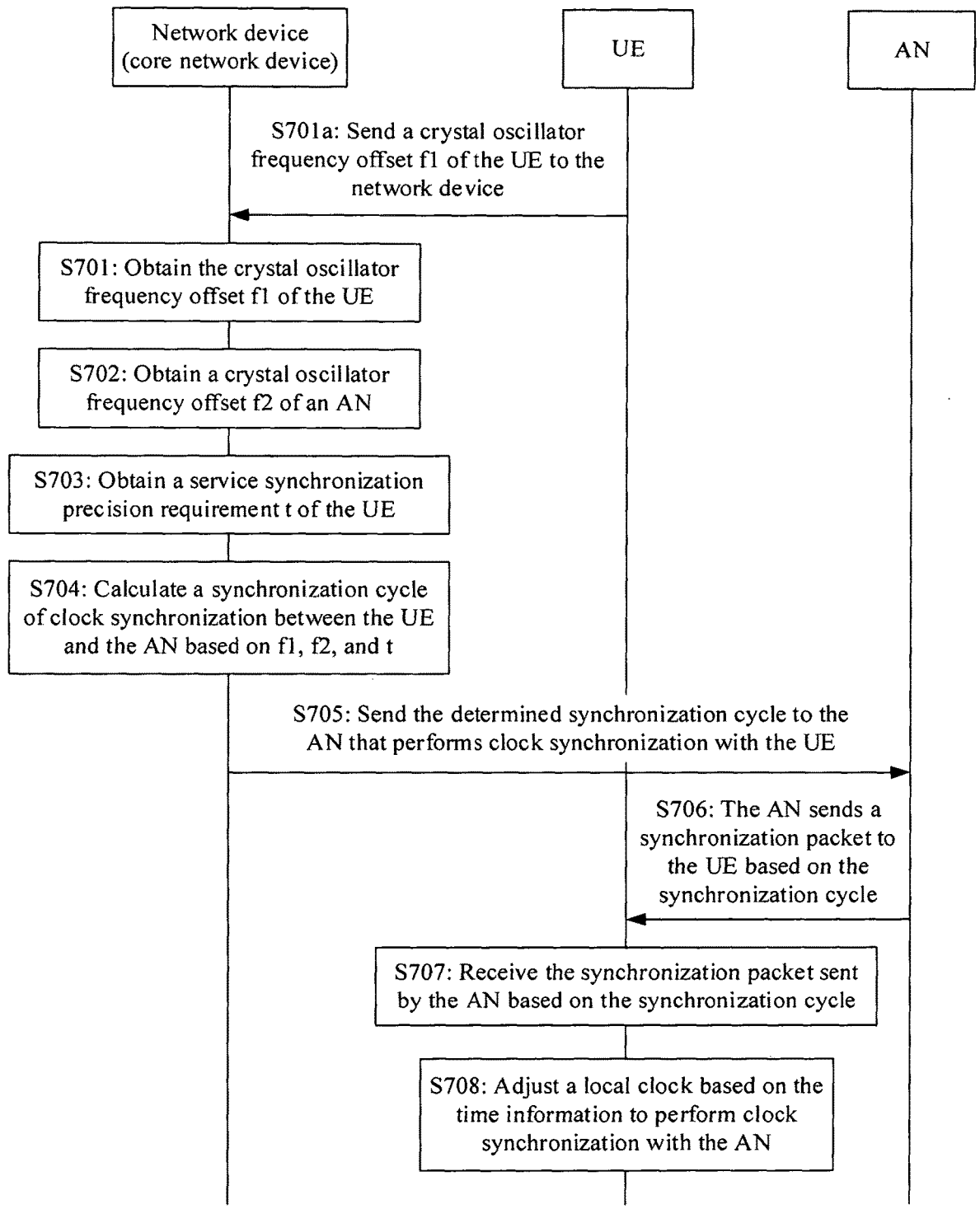
FIG. 9 is still another schematic flowchart of a method for determining a synchronization cycle according to an embodiment of this application.
Figure 10:
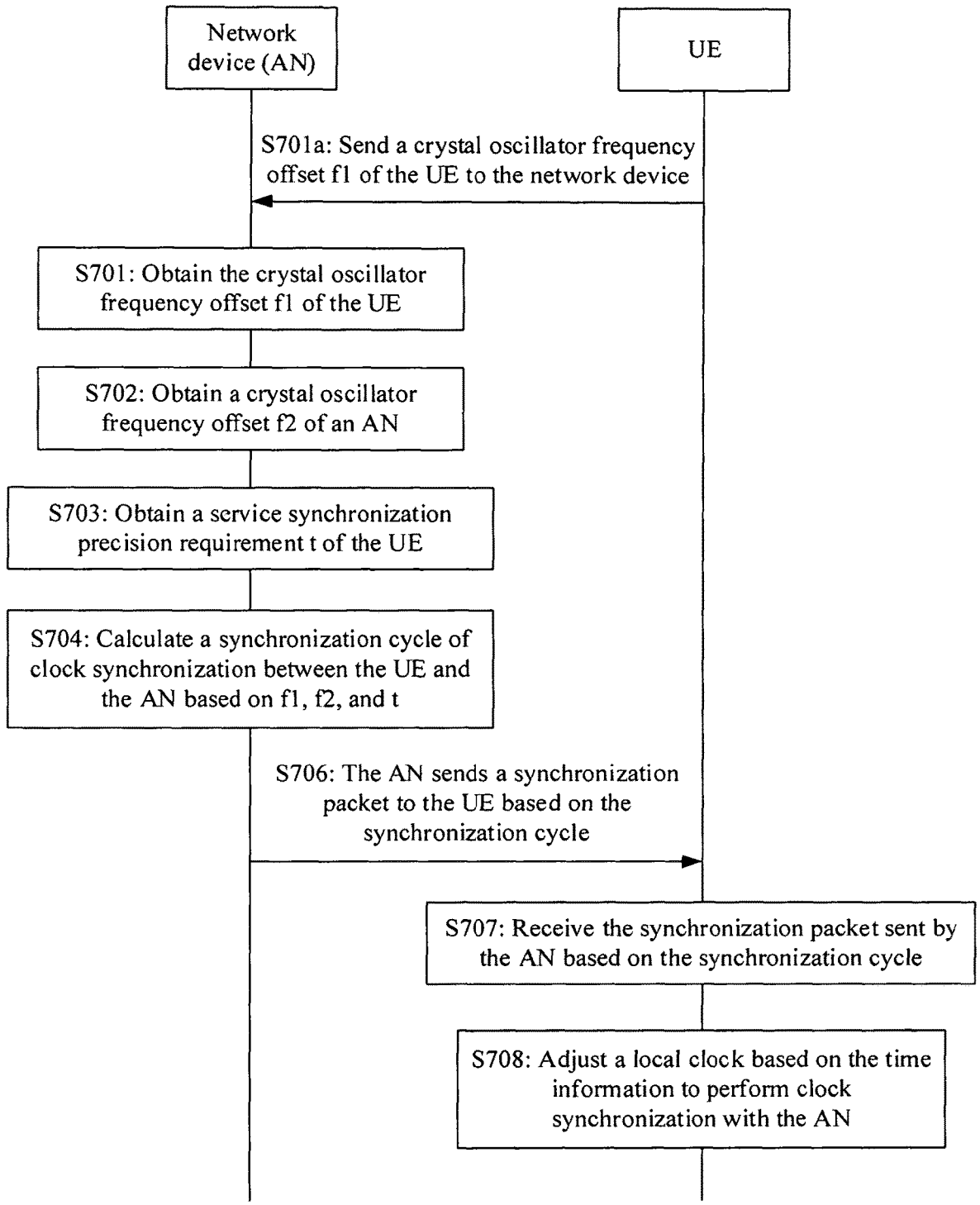
FIG. 10 is yet another schematic flowchart of a method for determining a synchronization cycle according to an embodiment of this application.

In the first possible implementation, the network device receives f1 from the UE, and then S701 is implemented as follows: The network device receives f1 from the UE, to obtain f1. Correspondingly, as shown in FIG. 8, FIG. 9, or FIG. 10, the method for determining a synchronization cycle provided in this application may further include S701*a*.

S701*a*: The UE sends the crystal oscillator frequency offset f1 of the UE to the network device.

f1 is used to determine a synchronization cycle of the clock synchronization between the UE and the access node AN.

Optionally, specific implementation of the first possible implementation in S701 varies with a type of the network device. The following describes the first possible implementation in specific cases. Specific implementation of S701 depends on a specific type of the network device, and may specifically include the following three cases:

Case 1: The network device includes the AN that performs clock synchronization with the UE.

In Case 1, that a network device obtains a crystal oscillator frequency offset f1 of UE in S701 is specifically implemented as follows: The AN receives f1 from the UE in a phase in which the UE registers with an access network.

Accordingly, in Case 1, S701*a* may be specifically implemented as follows: In the phase in which the UE registers with the access network, the UE sends f1 to the AN that performs clock synchronization with the UE.

For example, in Case 1, in the phase in which the UE registers with the access network, the UE may add f1 to an interaction message between the UE and the AN and send the interaction message to the AN, and then the AN obtains f1 from the interaction message.

Optionally, in the phase in which the UE registers with the access network, the interaction message used to carry f1 may be an interaction message between the UE and the AN in an existing registration procedure, or may be a newly added interaction message dedicated to sending f1. This is not specifically limited in this embodiment of this application.

For example, in the phase in which the UE registers with the access network, the UE may send, to the AN, a registration request that carries f1, and the AN obtains f1 from the registration request.

Case 2: The network device may include a core network device of a mobile network accessed by the UE.

In Case 2, that a network device obtains a crystal oscillator frequency offset f1 of UE in S701 is specifically implemented as follows: The core network device receives f1 from the UE in a PDU session creation phase.

Accordingly, in Case 2, S701*a* may be specifically implemented as follows: In the PDU session creation phase, the UE sends f1 to the core network device connected to the AN that performs clock synchronization with the UE.

For example, in Case 2, the UE may add f1 to an interaction message between the UE and the core network device in the PDU session creation phase and send the interaction message to the core network device, and then the core network device obtains f1 from the interaction message.

Optionally, in the PDU session creation phase, the interaction message used to carry f1 may be an interaction message between the UE and the core network device in an existing PDU session creation procedure, or may be a newly added interaction message dedicated to sending f1. This is not specifically limited in this embodiment of this application.

For example, in the PDU session creation phase, the UE may send, to the core network device, a PDU session creation request that carries f1, and the core network device obtains f1 from the PDU session creation request.

Case 3: The network device includes the AN that performs clock synchronization with the UE, and the AN is a target AN used when the UE is handed over from an access network.

In Case 3, that a network device obtains a crystal oscillator frequency offset f1 of UE in S701 is specifically implemented as follows: In a handover phase, the AN obtains f1 from the UE by using a handover command.

Accordingly, in Case 3, S701*a* may be specifically implemented as follows: In the handover phase, the UE sends f1 to the AN that performs clock synchronization with the UE.

For example, in Case 3, the UE may add f1 to an interaction message between the UE and the target AN in the handover phase and send the interaction message to the target AN, and then the target AN obtains f1 from the interaction message.

Optionally, in the handover phase, the interaction message used to carry f1 may be an interaction message between UE and the target AN in an existing handover phase, or may be a newly added interaction message dedicated to sending f1. This is not specifically limited in this embodiment of this application.

For example, in the handover phase, the UE may send, to the target AN, handover complete signaling that carries f1, and the target AN obtains f1 from the handover complete signaling.

Second possible implementation: the network device includes the AN that performs clock synchronization with the UE, and the AN is the target AN used when the UE is handed over from an access network. In S701, the target AN obtains f1 from the source AN by using the handover command.

For example, in the second possible implementation, in a handover phase, the source AN may add f1 to an interaction message between the source AN and the target AN and send the interaction message to the target AN, and then the target AN obtains f1 from the interaction message.

Optionally, in the handover phase, the interaction message used to carry f1 may be an interaction message between the source AN and the target AN in an existing handover phase, or may be a newly added interaction message dedicated to sending f1. This is not specifically limited in this embodiment of this application.

For example, in the handover phase, the source AN may send, to the target AN, handover request signaling that carries f1, and the target AN obtains f1 from the handover request signaling.

S702: The network device obtains a crystal oscillator frequency offset f2 of the AN.

As described above, a frequency offset of a crystal oscillator is an inherent attribute of the crystal oscillator. The frequency offset f2 of a crystal oscillator deployed in the AN is a known parameter for the AN, and the network device may obtain f2 from the AN.

Optionally, corresponding to Case 1, Case 3, and the second possible implementation in S701, when the network device includes the AN that performs clock synchronization with the UE, regardless of whether the AN is an AN with which the UE registers or a target AN to which the UE is handed over, the AN may directly read f2 to implement S702.

Optionally, corresponding to Case 2 in S701, when the network device includes a core network device, the AN that performs clock synchronization with the UE is an AN with which the UE registers for access, and that the network device obtains a crystal oscillator frequency offset f2 of the AN in S702 includes: The core network device receives f2 from the AN in a PDU session creation phase.

For example, in the PDU session creation phase, the AN may add f2 to an interaction message between the AN and the core network device and send the interaction message to the core network device, and then the core network device obtains f2 from the interaction message. Optionally, in the PDU session creation phase, the interaction message used to carry f2 may be an interaction message between the AN and the core network device in an existing PDU session creation procedure, or may be a newly added interaction message dedicated to sending f2. This is not specifically limited in this embodiment of this application.

For example, in the PDU session creation phase, the AN may send, to the core network device, an N2 creation request that carries f2, and the core network device obtains f2 from the N2 creation request.

Optionally, corresponding to Case 2 in S701, when the network device includes a core network device, and the AN that performs clock synchronization with the UE is the target AN used when the UE is handed over from an access network, that the network device obtains a crystal oscillator frequency offset f2 of the AN in S702 includes: The core network device obtains f2 from the target AN by using a handover command.

For example, in the handover phase, the target AN may add f2 to an interaction message between the target AN and the core network device and send the interaction message to the core network device, and then the core network device obtains f2 from the interaction message. Optionally, in the handover phase, the interaction message used to carry f2 may be an interaction message between the target AN and the core network device in an existing handover procedure, or may be a newly added interaction message dedicated to sending f2. This is not specifically limited in this embodiment of this application.

For example, in the handover phase, the target AN may send, to the core network device, an N2 creation request that carries f2, and the core network device obtains f2 from the N2 creation request.

S703: The network device obtains a service synchronization precision requirement t of the UE.

The service synchronization precision requirement t of the UE is determined by a service subscribed to by the UE, and is stored in a unified data management (UDM) system in the core network. Each service supported by the network has its own requirement on synchronization precision, namely, a maximum clock deviation allowed by the service. The service synchronization precision requirement t of the UE is a minimum synchronization precision requirement among synchronization precision requirements of all services subscribed to by the UE.

In a possible implementation, corresponding to the first possible implementation in S701, that the network device obtains a service synchronization precision requirement t of the UE in S703 may include: The network device obtains t from a core network device.

In this possible implementation, corresponding to Case 2 in S701, when the network device includes a core network device, the network device may obtain t from the UDM through interaction between network elements inside the core network in S703.

In this possible implementation, corresponding to Case 1 in S701, when the network device includes the AN that performs clock synchronization with the UE, and the AN is an AN with which the UE registers for access, that the network device obtains a service synchronization precision requirement t of the UE in S703 may include: The AN receives t from the core network device in a PDU session creation phase.

For example, the core network device obtains t from the UDM through interaction between the network elements inside the core network. Then, the core network device may add t to an interaction message between the core network device and the AN in the PDU session creation phase and send the interaction message to the AN, and then the AN obtains t from the interaction message.

Optionally, in the PDU session creation phase, the interaction message used to carry t may be an interaction message between the core network device and the AN in an existing PDU session creation procedure, or may be a newly added interaction message dedicated to sending t. This is not specifically limited in this embodiment of this application.

For example, in the PDU session creation phase, the core network device may send, to the AN, a PDU session creation request that carries t, and the AN obtains t from the PDU session creation request.

In this possible implementation, corresponding to Case 3 in S701, when the network device includes the AN that performs clock synchronization with the UE, and the AN is the target AN used when the UE is handed over from an access network, that the network device obtains a service synchronization precision requirement t of the UE in S703 may include: The target AN obtains t from the core network device in a handover phase.

For example, the core network device obtains t from the UDM through interaction between the network elements inside the core network. Then, the core network device may add t to an interaction message between the core network device and the target AN in the handover phase and send the interaction message to the target AN, and then the target AN obtains t from the interaction message.

Optionally, in the handover phase, the interaction message used to carry t may be an interaction message between the core network device and the target AN in an existing handover procedure, or may be a newly added interaction message dedicated to sending t. This is not specifically limited in this embodiment of this application.

For example, in the handover phase, the core network device may send, to the target AN, a path request response command that carries t, and the target AN obtains t from the path request response command.

In another possible implementation, corresponding to the second possible implementation in S701, the network device includes the AN that performs clock synchronization with the UE, and the AN is the target AN used when the UE is handed over from an access network. That the network device obtains a service synchronization precision requirement t of the UE in S703 includes: The target AN obtains t from a source AN by using a handover command.

For example, in this possible implementation, in a handover phase, the source AN may add t to an interaction message between the source AN and the target AN and send the interaction message to the target AN, and then the target AN obtains t from the interaction message.

Optionally, in the handover phase, the interaction message used to carry t may be an interaction message between the source AN and the target AN in an existing handover phase, or may be a newly added interaction message dedicated to sending t. This is not specifically limited in this embodiment of this application.

For example, in the handover phase, the source AN may send, to the target AN, handover request signaling that carries t, and the target AN obtains t from the handover request signaling.

It should be noted that the interaction message used to send f1 by the source AN to the target AN in the second possible implementation in S701 and the interaction message used to send t by the source AN to the target AN in S703 may be a same message, or may be two different messages. This is not specifically limited in this embodiment of this application.

S704: The network device calculates a synchronization cycle of clock synchronization between the UE and the AN based on f1, f2, and t.

In the synchronization cycle of the clock synchronization between the UE and the AN, it requires a capability to correct, in time, a clock deviation caused by the crystal oscillator frequency offset of the AN and the crystal oscillator frequency offset of the UE, to meet the service synchronization precision requirement t of the UE. Therefore, the synchronization cycle of the clock synchronization between the UE and the AN is strongly related to f1, f2, and t. Therefore, according to a network requirement, the synchronization cycle of the clock synchronization between the UE and the AN may be calculated as a mathematical expression of f1, f2, and t.

An embodiment of this application provides a calculation expression for calculating the synchronization cycle of the clock synchronization between the UE and the AN based on f1, f2, and t, including: calculating the synchronization cycle of the clock synchronization between the UE and the AN as $t/(f1+f2)$.

Certainly, the synchronization cycle of the clock synchronization between the UE and the AN is alternatively calculated as another mathematical expression of f1, f2, and t according to an actual network requirement. For example, the mathematical expression may be $at/b$ $(f1+f2)$, where a and b are integers greater than 0. This is merely an example for description, and is not a specific limitation on the mathematical expression.

Optionally, according to an actual requirement, another parameter may be further introduced on the basis of f1, f2, and t to calculate the synchronization cycle of the clock synchronization between the UE and the AN. This is not specifically limited in this embodiment of this application.

In the method for determining a synchronization cycle provided in this application, after obtaining f1, f2, and t, the network device calculates the synchronization cycle of the clock synchronization between the UE and the AN. Because the synchronization cycle is determined based on crystal oscillator performance of both clock synchronization parties and a synchronization requirement of the UE, the determined synchronization cycle meets the synchronization requirement of the UE, and also complies with the crystal oscillator performance of both the clock synchronization parties. Therefore, a proper synchronization cycle is determined in the solution of this application, and the clock synchronization between the UE and the AN is performed based on the proper synchronization cycle. On the basis of meeting a synchronization precision requirement of the UE, a waste of air interface bandwidth resources and a waste of battery power of the UE that are caused by frequent synchronization are avoided, and the proper synchronization cycle is determined, thereby ensuring that air interface bandwidth resources are saved during clock synchronization in an industrial factory, reducing energy consumption of the UE, and saving battery power.

Further optionally, as shown in FIG. 9, when the network device is a core network device, after S704, the method for determining a synchronization cycle provided in this application may further include S705.

S705: The core network device sends the determined synchronization cycle to the AN that performs clock synchronization with the UE.

Further, as shown in FIG. 9, when the network device includes a core network device, after S705, the method for determining a synchronization cycle provided in this application may further include S706 to S708. Alternatively, as shown in FIG. 10, when the network device includes the AN that performs clock synchronization with the UE, after S704, the method for determining a synchronization cycle provided in this application may further include S706 to S708.

S706: The AN sends a synchronization packet to the UE based on the synchronization cycle.

The synchronization packet carries time information of the AN.

S707: The UE receives the synchronization packet sent by the AN based on the synchronization cycle.

S708: The UE adjusts a local clock based on the time information to perform clock synchronization with the AN.

The foregoing mainly describes the solutions provided in the embodiments of this application from perspectives of working processes of the network device and the UE. It may be understood that, to implement the foregoing functions, the network device and the UE include corresponding hardware structures and/or software modules for performing the functions. Persons skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

It should be noted that a function part that is of the network and the UE and that performs the method for determining a synchronization cycle provided in this application is referred to as an apparatus for determining a synchronization cycle. It may be understood that the apparatus for determining a synchronization cycle may be equivalent to the network device or the UE, or the apparatus for determining a synchronization cycle may be deployed in the network device or the UE, to support the network device or the UE in performing the method for determining a synchronization cycle provided in this application. The network device may include an AN or a core network device.

In this embodiment of this application, functional modules in the network device and the UE may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In an actual implementation, another division manner may be used. If the apparatus for determining a synchronization cycle is a part or all of the network device and the UE, dividing the network device and the UE into functional modules is equivalent to dividing the apparatus for determining a synchronization cycle into functional modules. Alternatively, if the apparatus for determining a synchronization cycle is a part or all of the network device and the UE, dividing the apparatus for determining a synchronization cycle into functional modules is equivalent to dividing the network device and the UE into functional modules.

Figure 11:
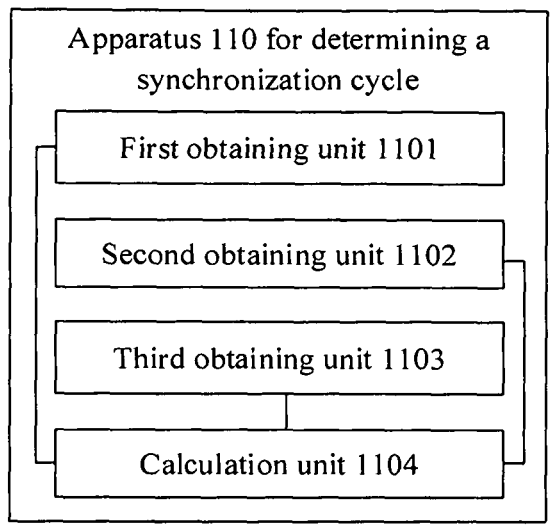
FIG. 11 is another schematic structural diagram of a network device according to an embodiment of this application.

If each functional module is obtained through division based on a corresponding function, FIG. 11 is a possible schematic structural diagram of an apparatus for determining a synchronization cycle deployed in the network device in the foregoing embodiments. An apparatus 110 for determining a synchronization cycle may include a first obtaining unit 1101, a second obtaining unit 1102, a third obtaining unit 1103, and a calculation unit 1104. The first obtaining unit 1101 is configured to perform the process S701 in FIG. 7, FIG. 8, FIG. 9, or FIG. 10. The second obtaining unit 1102 is configured to perform the process S702 in FIG. 7, FIG. 8, FIG. 9, or FIG. 10. The third obtaining unit 1103 is configured to perform the process S703 in FIG. 7, FIG. 8, FIG. 9, or FIG. 10. The calculation unit 1104 is configured to perform the process S704 in FIG. 7, FIG. 8, FIG. 9, or FIG. 10. All related content of the steps in the foregoing method embodiments may be cited in function descriptions of a corresponding functional module. Details are not described herein again.

Figure 12:
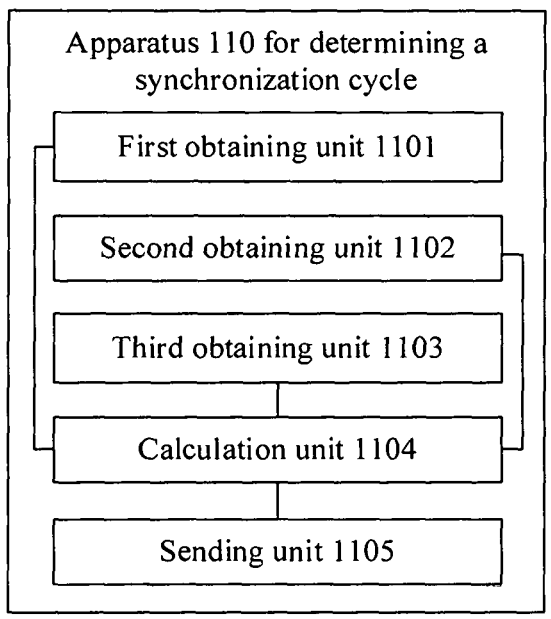
FIG. 12 is still another schematic structural diagram of a network device according to an embodiment of this application.

Further, as shown in FIG. 12, the apparatus 110 for determining a synchronization cycle may further include a sending unit 1105. The sending unit 1105 is configured to perform the process S705 in FIG. 9, or the sending unit 1105 is configured to perform the process S706 in FIG. 10.

Figure 13:
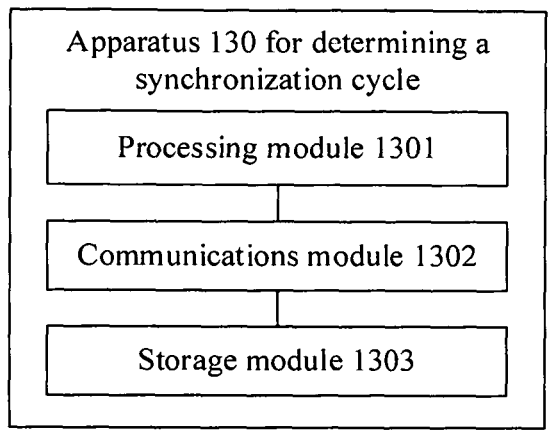
FIG. 13 is yet another schematic structural diagram of a network device according to an embodiment of this application.

If an integrated unit is used, FIG. 13 is a possible schematic structural diagram of an apparatus for determining a synchronization cycle in the network device in the foregoing embodiments. An apparatus 130 for determining a synchronization cycle may include a processing module 1301 and a communications module 1302. The processing module 1301 is configured to control and manage an action of the apparatus 130 for determining a synchronization cycle. For example, the processing module 1301 is configured to perform the processes S701 to S704 in FIG. 7, FIG. 8, FIG. 9, or FIG. 10. The processing module 1301 is further configured to perform the process S705 in FIG. 9 or the process S706 in FIG. 10 by using the communications module 1302. The apparatus 130 for determining a synchronization cycle may further include a storage module 1303, configured to store program code and data of the apparatus 130 for determining a synchronization cycle.

If the apparatus 130 for determining a synchronization cycle is deployed in a network device (an AN or a core network device), the processing module 1301 may be the processor 301 in the entity structure of the network device 30 shown in FIG. 3, and may be a processor or a controller. For example, the processing module 1301 may be a CPU, a general-purpose processor, a DSP, an ASIC, an FPGA or another programmable logic device, a transistor logic device, a hardware component, or any combination thereof.

The processing module 1301 may implement or execute various example logical blocks, modules, and circuits described with reference to content disclosed in this application. Alternatively, the processor 1301 may be a combination of processors implementing a computing function, for example, a combination of one or more microprocessors, or a combination of a DSP and a microprocessor. The communications module 1302 may be the transceiver 303 in an entity structure of the network device 30 shown in FIG. 3. The communications module 1302 may be a communications port, or may be a transceiver, a transceiver circuit, a communications interface, or the like. Alternatively, the foregoing communications interface may communicate with another device via the foregoing element that has receiving and sending functions. The foregoing element that has receiving and sending functions may be implemented via an antenna and/or a radio frequency apparatus. The storage module 1303 may be the memory 302 in the entity structure of the network device 30 shown in FIG. 3.

If the processing module 1301 is a processor, the communications module 1302 is a transceiver, and the storage module 1303 is a memory, the apparatus 130 for determining a synchronization cycle in FIG. 13 in the embodiments of this application may be a part or all of the network device 30 shown in FIG. 3, or may be a part or all of the AN 50 shown in FIG. 5, or may be a part or all of the core network device 60 shown in FIG. 6.

As described above, the apparatus 110 for determining a synchronization cycle or the apparatus 130 for determining a synchronization cycle provided in this embodiment of this application may be configured to implement functions of the network device in the methods implemented in the foregoing embodiments of this application. For ease of description, only a part related to this embodiment of this application is shown. For specific technical details that are not disclosed, refer to the embodiments of this application.

Figure 14:
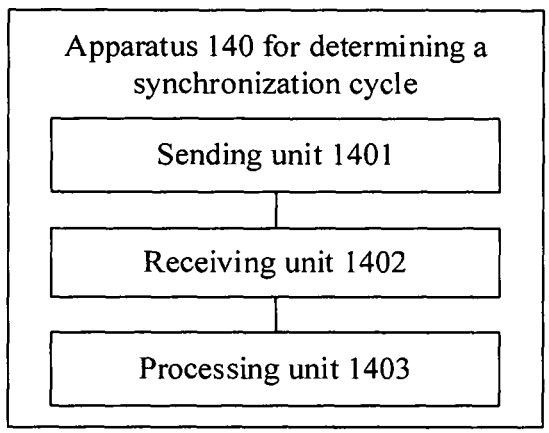
FIG. 14 is another schematic structural diagram of UE according to an embodiment of this application.

If each functional module is obtained through division based on a corresponding function, FIG. 14 is a possible schematic structural diagram of an apparatus for determining a synchronization cycle in the UE in the foregoing embodiments. An apparatus 140 for determining a synchronization cycle may include a sending unit 1401, a receiving unit 1402, and a processing unit 1403. The sending unit 1401 is configured to perform the process S701a in FIG. 8, FIG. 9, or FIG. 10. The receiving unit 1402 is configured to perform the process S707 in FIG. 10. The processing unit 1403 is configured to perform the process S708 in FIG. 10. All related content of the steps in the foregoing method embodiments may be cited in function descriptions of a corresponding functional module. Details are not described herein again.

Figure 15:
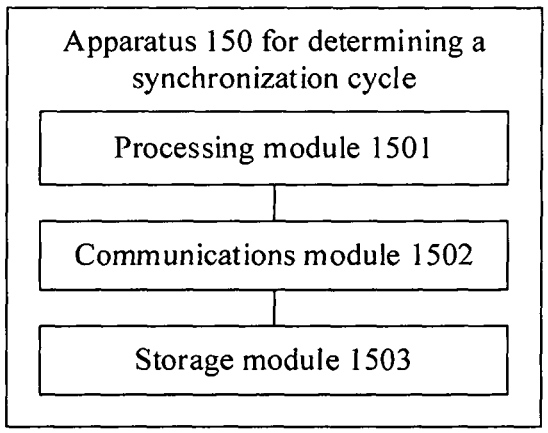
FIG. 15 is still another schematic structural diagram of UE according to an embodiment of this application.

If an integrated unit is used, FIG. 15 is a possible schematic structural diagram of an apparatus for determining a synchronization cycle in the UE in the foregoing embodiments. An apparatus 150 for determining a synchronization cycle may include a processing module 1501 and a communications module 1502. The processing module 1501 is configured to control and manage an action of the apparatus 150 for determining a synchronization cycle. For example, the processing module 1501 is configured to support, by using the communications unit 1502, the apparatus 150 for determining a synchronization cycle in performing the process S701a in FIG. 8, FIG. 9, or FIG. 10, or perform the process S707 in FIG. 10. The processing module 1501 is configured to support the apparatus 150 for determining a synchronization cycle in performing the process S708 in FIG. 10. The apparatus 150 for determining a synchronization cycle may further include a storage module 1503, configured to store program code and data of the apparatus 150 for determining a synchronization cycle.

If the apparatus 150 for determining a synchronization cycle is deployed in the UE, the processing module 1501 may be the processor 401 in an entity structure of the UE 40 shown in FIG. 4, and may be a processor or a controller. For example, the processing module 1501 may be a CPU, a general-purpose processor, a DSP, an ASIC, an FPGA or another programmable logic device, a transistor logic device, a hardware component, or any combination thereof. The processing module 1501 may implement or execute various example logical blocks, modules, and circuits described with reference to content disclosed in this application. Alternatively, the processor 1501 may be a combination of processors implementing a computing function, for example, a combination of one or more microprocessors, or a combination of a DSP and a microprocessor. The communications module 1502 may be the transceiver 403 in an entity structure of the UE 40 shown in FIG. 4. The communications module 1502 may be a communications port, or may be a transceiver, a transceiver circuit, a communications interface, or the like. Alternatively, the foregoing communications interface may communicate with another device via the foregoing element that has receiving and sending functions. The foregoing element that has receiving and sending functions may be implemented via an antenna and/or a radio frequency apparatus. The storage module 1503 may be the memory 402 in the physical structure of the UE 40 shown in FIG. 4.

If the processing module 1501 is a processor, the communications module 1502 is a transceiver, and the storage module 1503 is a memory, the apparatus 150 for determining a synchronization cycle in FIG. 15 in the embodiments of this application may be a part or all of the UE 40 shown in FIG. 4.

As described above, the apparatus 140 for determining a synchronization cycle or the apparatus 150 for determining a synchronization cycle provided in this embodiment of this application may be configured to implement functions of UE in the methods implemented in the foregoing embodiments of this application. For ease of description, only a part related to this embodiment of this application is shown. For specific technical details that are not disclosed, refer to the embodiments of this application.

According to still another aspect, an embodiment of this application provides a system for determining a synchronization cycle, including the network device described in any one of the foregoing embodiments and the UE described in any one of the foregoing embodiments.

The method or algorithm steps described with reference to the content disclosed in this application may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components. Alternatively, a memory may be coupled to the processor. For example, the memory may exist independently, and is connected to the processor by using a bus. The memory may be alternatively integrated with the processor. The memory may be configured to store application program code for executing the technical solutions provided in the embodiments of this application, and the processor controls the execution. The processor is configured to execute the application program code stored in the memory, to implement the technical solutions provided in the embodiments of this application.

An embodiment of this application further provides a chip system. The chip system includes a processor, configured to implement the technical methods of a communications device that are in the embodiments of the present disclosure. In a possible design, the chip system further includes a memory, configured to store a program instruction and/or data that are/is necessary for the communications device in the embodiments of the present disclosure. In a possible design, the chip system further includes a memory, configured for the processor to invoke application program code stored in the memory. The chip system may include one or more chips, or may include a chip and another discrete device. This is not specifically limited in this embodiment of this application.

It may be clearly understood by persons skilled in the art that, for ease of description and brevity, for a detailed working process of the foregoing system, apparatus, and unit, refer to a corresponding process in the foregoing method embodiments, and details are not described herein again.

Persons skilled in the art should be aware that in the foregoing one or more examples, functions described in this application may be implemented by hardware, software, firmware, or any combination thereof. When the functions described in the embodiments are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. It may be clearly understood by persons skilled in the art that, for ease of description and brevity, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a synchronization cycle, wherein the method comprises:
sending, by user equipment (UE), a crystal oscillator frequency offset f1 of the UE to a network device comprising a core network device in a protocol data unit (PDU) session creation phase, wherein f1 is used to determine a synchronization cycle of clock synchronization between the UE and an access node (AN);
receiving, by the UE, a synchronization packet sent by the AN based on the synchronization cycle, wherein the synchronization packet carries time information of the AN;
adjusting, by the UE, a local clock based on the time information to perform clock synchronization with the AN.

2. The method for determining a synchronization cycle according to claim 1, wherein the network device comprises the AN; and
the sending, by the UE, a crystal oscillator frequency offset f1 of the UE to the network device comprises:
sending, by the UE, f1 to the AN in a phase in which UE registers with an access network.

3. The method for determining a synchronization cycle according to claim 1, wherein the network device comprises the AN, and the AN is a target AN used when the UE is handed over from an access network; and
the sending, by the UE, a crystal oscillator frequency offset f1 of the UE to the network device comprises:
sending, by the UE, f1 to the target AN by using a handover command.

4. An apparatus for determining a synchronization cycle, wherein the apparatus comprises:
an interface;
a processor; and
a non-transitory computer-readable storage medium storing a program to be executed by the processor, the program including instructions to:
obtain a crystal oscillator frequency offset f1 of user equipment (UE);
obtain a crystal oscillator frequency offset f2 of an access node (AN);
obtain a service synchronization precision requirement t of the UE from a core network device in a protocol data unit (PDU) session creation phase; and
calculate a synchronization cycle of clock synchronization between the UE and the AN based on f1 obtained by a first obtaining unit, f2 obtained by a second obtaining unit, and t obtained by a third obtaining unit.

5. The apparatus for determining a synchronization cycle according to claim 4, wherein the program includes instructions to obtain f1 from the UE.

6. The apparatus for determining a synchronization cycle according to claim 4, wherein the program includes instructions to obtain f2 from the AN.

7. The apparatus for determining a synchronization cycle according to claim 4, wherein the program includes instructions to obtain t from a core network device.

8. The apparatus for determining a synchronization cycle according to claim 4, wherein
the apparatus is deployed in the AN, and the program includes instructions to receive, using the interface, f1 from the UE in a phase in which UE registers with an access network.

9. The apparatus for determining a synchronization cycle according to claim 4,
wherein the apparatus is deployed in the core network device;
the program includes instructions to receive, using the interface, f1 from the UE in a PDU session creation phase;
receive, using the interface, f2 from the AN in the PDU session creation phase; and
send, using the interface, the synchronization cycle to the AN.

10. The apparatus for determining a synchronization cycle according to claim 4, wherein the apparatus is deployed in the AN, and the AN is a target AN used when the UE is handed over from an access network;
the program includes instructions to obtain f1 from a source AN by using a handover command; and
obtain the t from the source AN by using the handover command.

11. The apparatus for determining a synchronization cycle according to claim 4, wherein the apparatus is deployed in the core network device, and the AN is a target AN used when the UE is handed over from an access network;
the program includes instructions to obtain f2 from the target AN by using a handover command; and
send, using the interface, the synchronization cycle to the AN.

12. The apparatus for determining a synchronization cycle according to claim 4, wherein the program includes instructions to calculate the synchronization cycle as $t/(f1+f2)$.

13. An apparatus for determining a synchronization cycle, wherein the apparatus comprises:
an interface;
a processor; and a non-transitory computer-readable storage medium storing a program to be executed by the processor, the program including instructions to:

send, using the interface, a crystal oscillator frequency offset f1 of user equipment (UE) to which the apparatus belongs to a network device comprising a core network device in a protocol data unit (PDU) session creation phase, wherein f1 is used to determine a synchronization cycle of clock synchronization between the UE and an access node (AN);

receive, using the interface, a synchronization packet sent by the AN based on the synchronization cycle, wherein the synchronization packet carries time information of the AN; and adjust a local clock of the UE based on the time information to perform clock synchronization with the AN.

14. The apparatus for determining a synchronization cycle according to claim 13, wherein the network device comprises the AN; and the program includes instructions to send f1 to the AN in a phase in which UE registers with an access network.

* * * * *